March 22, 1966    R. D. RUBENSTEIN    3,241,394
DOUBLE PEDAL ACTUATOR ASSEMBLY
Filed Feb. 14, 1964    2 Sheets-Sheet 1

Inventor:
Raymond D. Rubenstein
By Walter L. Gregory
Atty.

March 22, 1966   R. D. RUBENSTEIN   3,241,394
DOUBLE PEDAL ACTUATOR ASSEMBLY
Filed Feb. 14, 1964   2 Sheets-Sheet 2

Inventor:
Raymond D. Rubenstein
By Walter G. Gregory
Atty.

United States Patent Office 3,241,394
Patented Mar. 22, 1966

3,241,394
DOUBLE PEDAL ACTUATOR ASSEMBLY
Raymond D. Rubenstein, La Grange Park, Ill., assignor to International Harvester Company, Chicago, Ill., a corporation of New Jersey
Filed Feb. 14, 1964, Ser. No. 344,869
2 Claims. (Cl. 74—512)

This invention relates to motion-transmitting devices but more particularly it is directed to a device for converting foot pedal or hand lever force and displacement into torque and angular displacement at a common shaft. More specifically, however, it is directed to a foot-operated pedal assembly adaptable for use with a mechanism requiring a forward and reverse control input from a neutral position.

A suitable and highly adaptable use for such a device, although it is not limited to such application, would be the swash plate control for a reversible variable displacement hydraulic pump.

It is a primary object, therefore, of the present invention to provide an improved foot-pedal operated mechanism for furnishing forward and reverse control input to a common shaft from a neutral position.

Another object is to provide a double pedal actuator wherein side-by-side pedals may be operated from a common pivot axis and in the same direction to provide forward control motion to a shaft by operation of one pedal and reverse control motion to said shaft by operation of the other pedal.

A further object is to provide side-by-side mounted pedals having separable resiliently yieldable linkage means connecting said pedals to opposite sides of a control shaft whereby depressing one pedal rotates the shaft in one direction while depressing the other pedal rotates the shaft in an opposite direction, and wherein both said movements require overcoming the resistance of both said yield link connections before said shaft rotates, and further wherein the yieldable link connection means are operative for returning said pedals to a neutral position when the depressing pressure is removed therefrom.

A still further object is to provide a double pedal actuator device operative for furnishing forward and reverse control of a shaft from a neutral position and having stop means disposed to limit maximum upward and downward movements of each of the pedals thereof.

A yet still further object is to provide a double pedal assembly connected by separate yieldable connections to a common control shaft and wherein a large movement of either one of the pedals produces a smaller movement of said control shaft thereby providing a very sensitive type of control for the shaft.

Further objects and advantages of the present invention will be apparent from the full description, reference being had to the accompanying drawings wherein a preferred form of the present invention is clearly shown.

Figure 1:
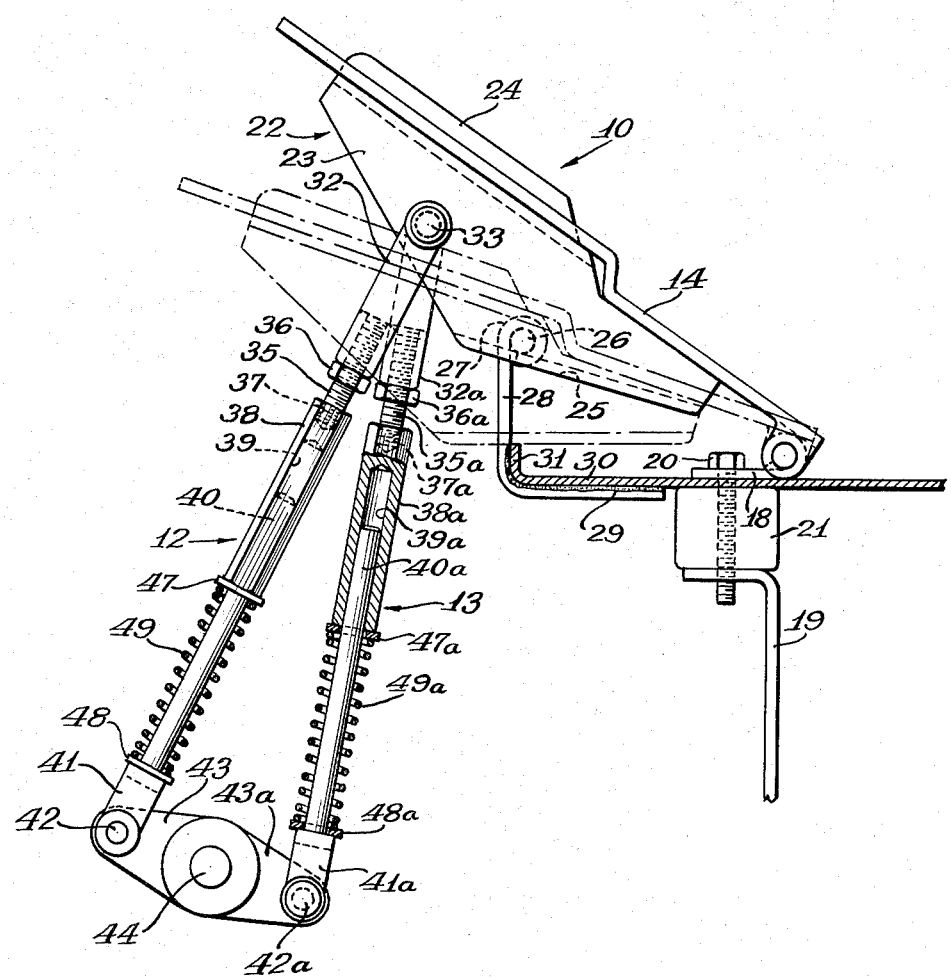
FIGURE 1 is a side elevational view of the proposed pedal assembly, with portions thereof shown in section, and having the depressed position of the pedals shown in broken lines.

Referring now to the drawings where there is illustrated one preferred embodiment of the present invention it will be seen that the proposed actuator device includes a pair of side-by-side pedals 10 and 11 pivotally mounted at one end thereof, and actuating linkage connecting means 12 and 13 pivotally mounted at points proximate the opposite ends of the pedals and operative upon movement of the respective pedals. Since the pedals are identical in construction with one adapted for positioning on the right and one for the left only one thereof need be described in detail. Similar elements will be designated by the same reference numerals but one will contain the suffix "a" to distinguish the right and left elements.

Each pedal includes a treadle member 14 having a pair of depending lugs or ears 15, 16 with an aperture in each that receives a pin or stud 17 pivotally mounted in a pair of spaced-apart brackets 18 and 18a and which, in turn, are supportably carried by a fixed support member such as indicated at 19 and demountably affixed in place by suitable securing means such as the bolts or cap screws 20, 20a with a spacer block 21 between said brackets and support.

Each of the pedals has a generally S-shaped flange 22 extending longitudinally along the edge thereof nearest the adjoining pedal and a portion of said flange depends as a flange 23 while a shorter portion 24 extends as a flange above the pedal treadle. The upper flange portion 24 provides a guide or stop for preventing the operator's foot from accidentally slipping off the pedal onto the adjacent pedal, while the lower edge portion of depending flange 23 is outwardly turned to provide a stop lip 25 which functions to delimit upward movement of the respective pedal. A pin 26 mounted in a turned-over edge portion 27 of a bracket 28 engages the lip 25 and thus limits upward movement of the pedal. Pin 26 extends outwardly in both directions from said bracket so that the lips 25, 25a on both said pedals may be engaged thereby. Bracket 28 has an overturned end portion 29 that is fixedly secured, by suitable means such as welding or the like, to a floor portion 30, in turn, secured to the support 19 by the bolt means 20. The free end of floor portion 30 is upwardly turned to provide a laterally extending stop flange 31 disposed to engage the pedal flanges or lips 25, 25a and thus provide stop means to limit downward movement of the pedals.

A clevis 32 is pivotally mounted by a pin 33 to the depending flange portion 23 and a cotter key such as shown at 34 may be provided to prevent accidental displacement of the latter pin. The opposite end of said clevis is internally threaded and has positioned therein a threaded shaft 35 which may be fixedly positioned therewithin by the lock nut 36. The opposite end of threaded shaft 35 is threadedly received in a threaded recess 37 in one end of an elongated cylinder member 38 while the opposite end of said cylinder is open to a bore 39 therewithin. Bore 39 has slidably mounted therein one end of a plunger rod 40 the opposite end of which is fixedly secured to a clevis 41 mounted by a pin 42 on one end of a crank arm 43. The opposite end of arm 43 is affixed to and constrained for rotation with a common control shaft 44, journalled by bearings 45, 45a, in turn, carried by fixed support 19. Suitable means, such as the cotter key 46, may be provided to prevent accidental displacement of pin 42.

Washers 47, 48 respectively, abut the lower end of cylinder 38 and the upper end of clevis 41 and serve as seats or abutments for an enlongated coil spring 49 so that when the pedal is depressed the spring is collapsed therebetween and plunger rod 40 slides or penetrates further into bore 39 to shorten the overall length of the link connection.

The linkage connection means 13 is similarly arranged and pivotally supported at the top on the adjoining pedal and at the bottom by affixment to an oppositely disposed crank arm 43a. As previously mentioned like elements of these components are designated with the same reference numerals but with the suffix "a" added.

It will be seen now that the two springs 49 and 49a oppose one another through the crank arms 43, 43a and common control shaft 44 and additionally serve to retain the pedals pressed against the upper stops and serving to always return the pedals to neutral when not in use. If desired, the springs may be preloaded by adjusting threaded shafts 35, 35a and thereby modifying the length of the linkage connecting means 12 and 13.

Figure 2:
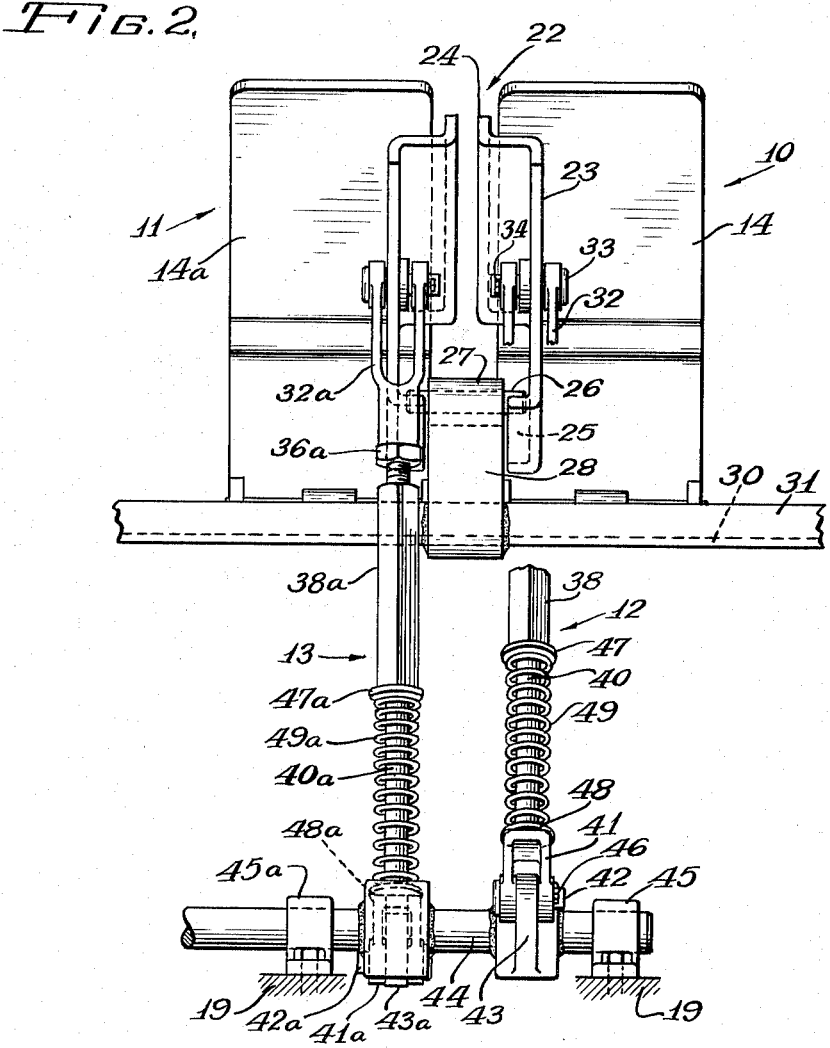
FIGURE 2 is an end elevational view of the assembly shown in the preceding view, and having portions thereof broken away to better show the details thereof.
Figure 3:
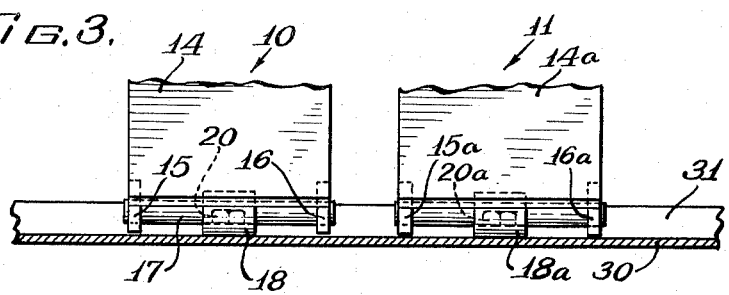
FIGURE 3 is a fragmentary end elevational view of the pivotally mounted ends of the pedals.

In operation, when it is desired to operate the control shaft 44, which as previously mentioned may be connected to any device requiring a forward and reverse control input from a neutral position, such as the swash plate in a variable displacement hydraulic pump, the appropriate pedal 10 or 11, depending upon whether forward or reverse control is required, is depressed. Assume first a neutral position, as shown in full lines for the pedals in FIGURE 2, in which instance the motion-transmitting yieldable linkage connections 12 and 13 will be extended to their limit and the pedals 10 and 11 will both be engaging the upper stop 26. Assume next a forward control input movement of control shaft 44 is desired whereupon pedal 10 is depressed causing a pressure on the upper end of motion-transmitting yieldable linkage connecting means 12 but since the lower end thereof is connected by crank arm 43 to shaft 44 this tends to rotate said shaft counterclockwise, as viewed in FIGURE 1 herein. Since shaft 44 is connected by crank arm 43a to yieldable linkage connection 13 when shaft 44 rotates counterclockwise the lower end of the latter motion-transmitting linkage will tend to rise but since the upper end of said linkage is restricted against further upward movement by the stop 26 the springs 49 and 49a are compressed to shorten the length of said linkages thereby permitting the rotation of control shaft 44. When the pedal 10 has been fully depressed the flange 23 thereon engages the lower stop 31 and restricts further movement thereof. As soon as pressure is removed from pedal 10 the reaction of springs 49 and 49a causes said pedal to be returned to its neutral position.

In order to effect a reverse control input of control shaft 44 pedal 11 is depressed thereby rotating said shaft clockwise and compressing yieldable linkage connecting means 12 and 13 as before. When pedal pressure is removed said pedal returns to its neutral position as before.

In this arrangement it will readily be seen that a large movement of the pedal produces only a small movement of the control shaft, because of the need for compressing both yieldable linkage connections, hence a very sensitive type of control is provided for the control shaft and incident thereto any device adapted for connection therewith.

Although only a preferred form of the invention has been illustrated, and that form described in detail, it will be apparent to those skilled in the art that various modifications may be made therein without departing from the spirit of the invention or from the scope of the appended claims.

What is claimed is:

1. In a plural pedal actuating mechanism for actuating a common shaft the combination, comprising: a fixed support; a plurality of foot-operated pedals pivotally mounted on said fixed support; a shaft pivotally mounted on said fixed support, and having axially spaced-apart crank arms constrained for movement therewith and extending in opposite directions from the shaft; longitudinally extendable and contractable links operatively connected one each between one of said pedals and a respective one of said crank arms and operative for imparting rotative movement to the shaft; stop means on said fixed support and engageable by each of said foot pedals to limit maximum upward and downward movements of said pedals; said links including resiliently yieldable means therein yieldable upon application of a predetermined force on said pedals, and said resilient means being disposed for normally maintaining said shaft in a neutral position and said pedals raised into abutting relation with said stop means; said links being further disposed so that upon application selectively of a predetermined amount of movement to one or the other of said pedals the link connected to the moved pedal is contracted against the reaction of the respective yieldable means while concurrently movement is transmitted through the arms of said shaft to effect a similar contraction against the reaction of the yieldable means of the link connected to the unmoved pedal as it is concurrently maintained in abutting relation with said stop means whereupon a limited amount of movement of said shaft away from its neutral position to either a forwardly or rearwardly rotative position thereof is effected.

2. In a plural pedal actuating mechanism for actuating a common shaft the combination, comprising: a fixed support; a plurality of foot-operated pedals pivotally mounted on said fixed support; a shaft pivotally mounted on said fixed support, and having axially spaced-apart crank arms constrained for movement therewith and extending in opposite directions from the shaft; longitudinally extendable and contractable links operatively connected one each between one of said pedals and a respective one of said crank arms and operative for imparting rotative movement to the shaft; stop means on said fixed support and engageable by each of said foot pedals to limit maximum upward and downward movements of said pedals; said links including resiliently yieldable means therein yieldable upon application of a predetermined force on said pedals, and said resilient means being disposed for normally maintaining said shaft in a neutral position and said pedals raised into abutting relation with said stop means; said links being disposed so that reactions of the individual resilient means thereof are opposed and upon application selectively of a predetermined amount of movement to one or the other of said pedals both said resilient means are contracted in tandem fashion to effect a limited amount of movement of said shaft away from its neutral position to either a forwardly or a rearwardly rotative position thereof.

References Cited by the Examiner

UNITED STATES PATENTS

| 543,903 | 8/1895 | Siebert | 74—36 |
|---|---|---|---|
| 1,795,719 | 3/1931 | Hardison | 74—512 X |
| 2,084,335 | 6/1937 | Freeman | 74—560 X |
| 2,367,076 | 1/1945 | Varblow | 74—478 |
| 2,604,962 | 7/1952 | Tibbetts | 74—470 X |
| 2,667,939 | 2/1954 | Purkey | 74—478 X |
| 2,964,970 | 12/1960 | Hiegel et al. | 74—560 |
| 3,157,063 | 11/1964 | Mussell | 74—512 |

FOREIGN PATENTS

| 923,186 | 2/1947 | France. |
|---|---|---|
| 661,225 | 11/1951 | Great Britain. |
| 925,225 | 5/1963 | Great Britain. |

BROUGHTON G. DURHAM, *Primary Examiner.*

C. F. GREEN, *Assistant Examiner.*